United States Patent [19]

Hartman

[11] Patent Number: 5,279,192
[45] Date of Patent: Jan. 18, 1994

[54] PORTABLE EXTERNAL DRIVE ASSEMBLY

[75] Inventor: Kenneth E. Hartman, Nashville, Tenn.

[73] Assignee: Ammco Tools Technology Corporation, Wilmington, Del.

[21] Appl. No.: 832,423

[22] Filed: Feb. 7, 1992

Related U.S. Application Data

[63] Continuation-in-part of Ser. No. 588,155, Sep. 26, 1990, abandoned.

[51] Int. Cl.$^5$ .......................... B23B 5/04; B23B 33/00
[52] U.S. Cl. ........................................ 82/112; 82/165; 81/176.15; 81/177.6; 279/102
[58] Field of Search .................... 74/416, 417, 479; 901/1, 23, 26, 41, 48; 248/129, 248, 291; 82/112, 165; 81/176.1, 176.15, 177.6; 279/96, 102, 904, 906

[56] References Cited

U.S. PATENT DOCUMENTS

| | | | |
|---|---|---|---|
| 1,100,097 | 6/1914 | Reed | 81/177.6 |
| 1,475,136 | 11/1923 | Olson | 279/102 |
| 2,285,956 | 6/1942 | Weber | 279/102 |
| 2,869,883 | 1/1959 | Dunbar | 279/102 |
| 4,336,730 | 6/1982 | Kopecko et al. | 82/112 |
| 4,819,523 | 4/1989 | Souza | 81/176.15 |
| 4,831,904 | 5/1989 | Agins | 81/176.15 |
| 4,876,929 | 10/1989 | Kozak | 81/177.6 |
| 4,982,629 | 1/1991 | Germain | 81/176.15 |
| 5,123,311 | 6/1992 | Dymek | 81/177.6 |

FOREIGN PATENT DOCUMENTS 619876 10/1980 Switzerland .................. 82/112

*Primary Examiner*—William E. Terrell
*Attorney, Agent, or Firm*—Patnaude, Videbeck & Marsh

[57] ABSTRACT

An external drive assembly is provided which conveys rotational movement to a shaft, and the shaft is adapted to be positioned substantially coaxial with the axis of the wheel hub of a motor vehicle. An adjustable drive member extends from the distal end of the shaft to the center of an adapter hub attachable to the wheel hub. Adjustable lug adapter legs are provided in which one end of each of such legs is adapted to attach to the threaded studs of an automobile wheel hub and the other end of each of the legs is provided with a cylindrical pin adapted to fit within one of a plurality of bores spaced around the peripheral edge of the adapter hub to retain the adapter leg within the adapter hub.

8 Claims, 4 Drawing Sheets

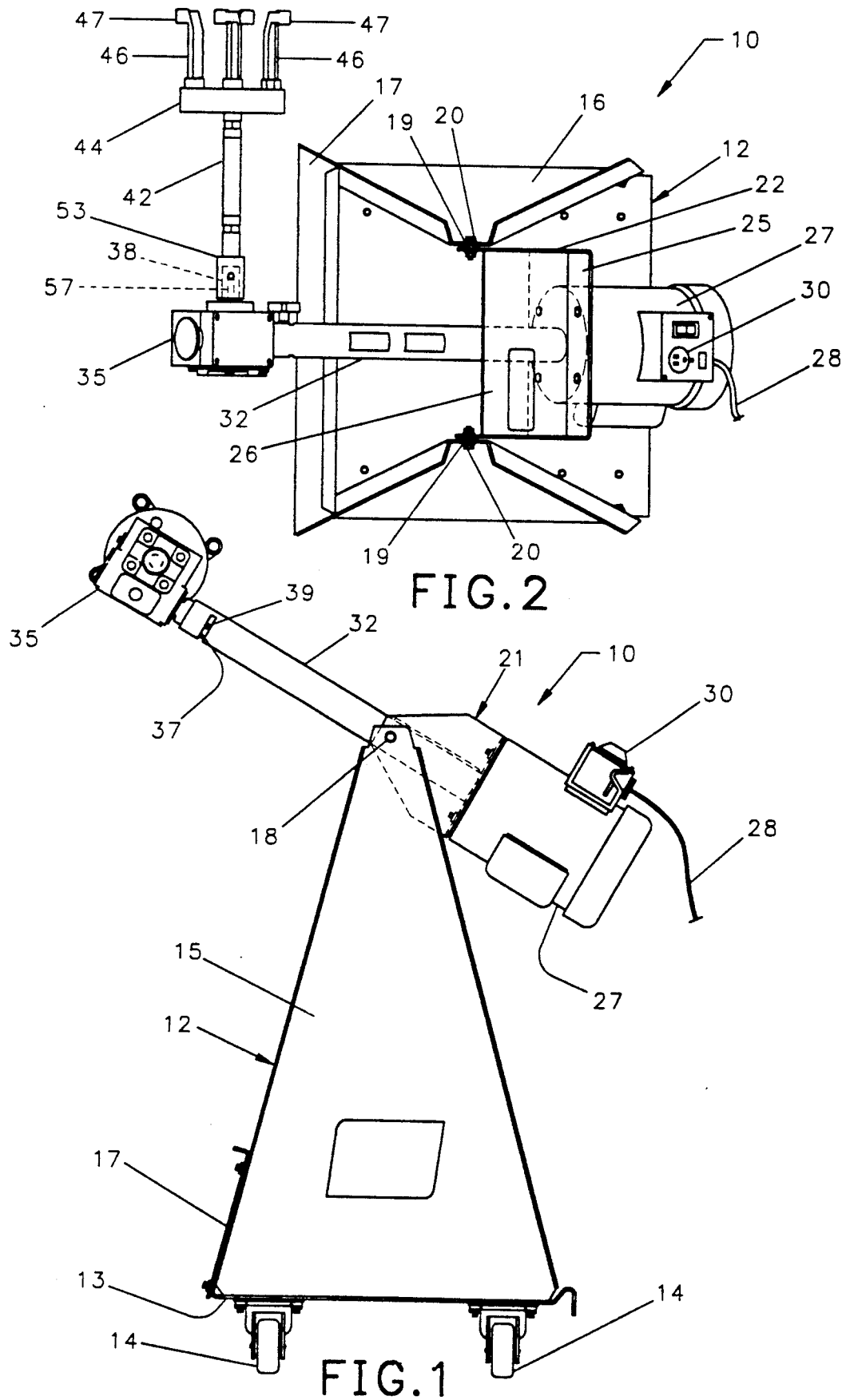

PORTABLE EXTERNAL DRIVE ASSEMBLY

The present application is a continuation-in-part of the application of Kenneth Hartman and Daniel O'Neill filed Sep. 26, 1990 and assigned Ser. No. 588,155 abandoned.

The invention relates generally to external drive assemblies for providing rotational power to a rotatable member and more particularly to an external drive assembly for rotating the wheel hub of a automobile in order to resurface a disc brake with an on-vehicle brake lathe.

BACKGROUND OF THE INVENTION

As a result of wear, the disc brake rotors of automobiles and the like wear unevenly and develop grooves therein. To extend their life, the rotors are machined in a lathe. The lathe removes the irregular outer surface of metal such that the rotor, after machining, is smooth. It is desirable to machine such disc brake rotors without removing them from a vehicle, with a portable external rotor and lathe assembly such as shown in U.S. Pat. No. 4,854,199 which has been assigned to the assignee of the present application. Another such portable brake lathe is shown in U.S. Pat. No. 4,388,846. The machining of the disc brake rotor while it remains on the vehicle requires less operating space than is needed for a conventional stand alone lathe that machines brake rotors after their removal from a vehicle. Furthermore, some wheel rotors cannot be removed without destroying the wheel bearings, and time is consumed in removing and reinstalling the discs on the vehicle, all of which results in higher costs. To machine the brake discs while on the vehicle, an exterior drive assembly is required which will rotate a wheel hub at a constant speed during the machining operation. Such external drive assemblies, however, are not affixed to the automobile, but are positioned adjacent the wheel hub. As as result, the drive assembly and the wheel hub may not be perfectly aligned with each other. If the connection between the two is not adapted to account for some misalignment, the drive assembly may fail and damage may be caused to the wheel hub. The present invention is intended to provide a drive assembly which has sufficient flexibility designed therein so as to enable it to operate efficiently, even when the drive assembly is not perfectly aligned with the wheel hub.

SUMMARY OF THE INVENTION

Briefly, the present invention is an improved drive assembly having a motor which conveys rotational movement to a shaft, and the shaft is adapted to be positioned substantially coaxial with the axis of the wheel hub. An important feature of the present invention is the provision of a flexible drive member which extends from the distal end of the shaft to the center of an adapter hub attachable to the wheel hub.

A second important feature of the present invention is the provision of adjustable lug adapter legs. One end of each of such legs is adapted to attach to the threaded studs of an automobile wheel hub and the other end of each of the legs is provided with a cylindrical pin adapted to fit within a plurality of bores spaced around the peripheral edge of the adapter hub. A pair of O-rings are also provided on the pin to removably retain the pins on the adapter hub during use.

BRIEF DESCRIPTION OF THE DRAWINGS

The features of the present invention which are believed to be novel are set forth in the attached claims, and the invention may be best understood by reference to the following description taken in conjunction with the attached sheets of drawings in which:

FIG. 1 is a plan view of a portable external drive assembly constructed in accordance with the present invention;

FIG. 2 is a top plan view of the portable external drive assembly shown in FIG. 1;

DETAILED DESCRIPTION OF THE PREFERRED EMBODIMENT

Figure 3:
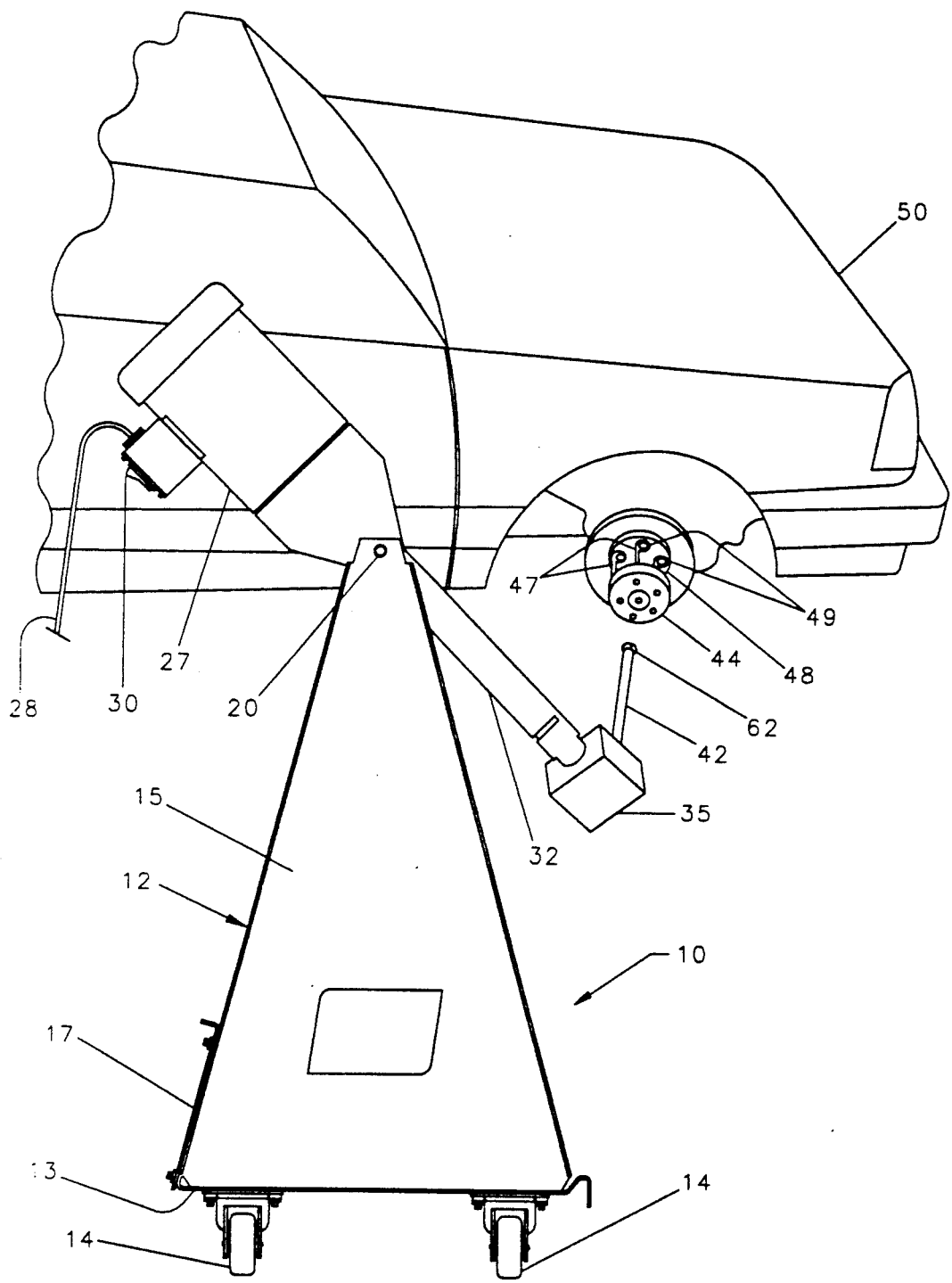
FIG. 3 is a perspective view of the drive assembly shown in FIG. 1 having a flexible drive member prepared to be attached to an adapter hub which has been secured to the wheel hub of an automobile.

Referring to FIGS. 1, 2 and 3, a portable external drive assembly 10 has a base section 12, and the base section 12 has a substantially rectangular floor portion 13 which is supported by a plurality of casters 14—14, one positioned at each corner. Connected to two opposing edges of the floor 13 are a pair of upwardly extending triangularly shaped side panels 15, 16 which are maintained in substantially vertical spaced relationship to each other by a connecting plate 17.

Each of the triangular side plates 15, 16 has transverse holes 18, 19, respectively, positioned at the apex of the triangle. A U-shaped yoke 21, is pivotally mounted on bolts 20—20 which extend through each of the transverse holes 18, 19. The yoke 21 has a pair of generally triangular shaped opposing end plates 22, 23 joined at their bottom by a bottom plate 25 thereby forming the contour of a U. The relationship of the side plates 22, 23 and the bottom plate 25 are maintained by a generally rectangular support plate 26 which is secured by welding, or such other appropriate means to the bottom plate 25 and both opposing end plates 22, 23.

Attached to the underside of the bottom plate 25 is a motor 27 having a shaft, not shown, which extends perpendicularly through an aperture (not shown) in the bottom plate 25. The motor 27 is electrically driven having a power line 28 and operated by a switch 30. The shaft, not shown, of the motor is enclosed in a housing 32 which extends a substantial distance beyond the length of the end plates 22, 23 and at the end of which is a gear box 35. The motor shaft (not shown) and housing 32 are sufficiently long such that the weight of the the gear box 35 and housing 32 counterbalances the weight of motor 27 and the entire assembly can be freely rotated about the pivot bolts 20-20. The gear box 35 can therefore be raised or lowered and can be maintained at a desired elevation with a minimum effort without being drawn by the force of gravity in either an upward or downward direction.

The gear box 35 is provided with an output shaft 38 the longitudinal axis of which is at approximately 90 degrees with the longitudinal axis of the housing 32 and enclosed motor shaft (not shown). The gear box 35 is pivotally mounted to the shaft housing 32 for rotation about the axis of the housing 32 and the enclosed shaft (not shown) and the gear box 35 may be locked into any desired angular position relative to the housing 32 by a set screw 39 extending through a slot 37 in the housing 32.

As shown in FIG. 2, the output shaft 38 of the gear box 35 is adapted to be attached to one end of a flexible drive member 42, and the opposing end of the flexible drive member 42 is attachable to a lug adapter hub 44 to which are attached a plurality of lug adapter legs 46. As shown in FIG. 3, each of the lug adapter legs 46-46 have a foot 47 with an aperture 103 therethrough which is adapted for mounting on one of the threaded studs 48—48 extending in evenly spaced parallel relationship from a wheel hub (not shown) of an automobile 50.

Figure 4:
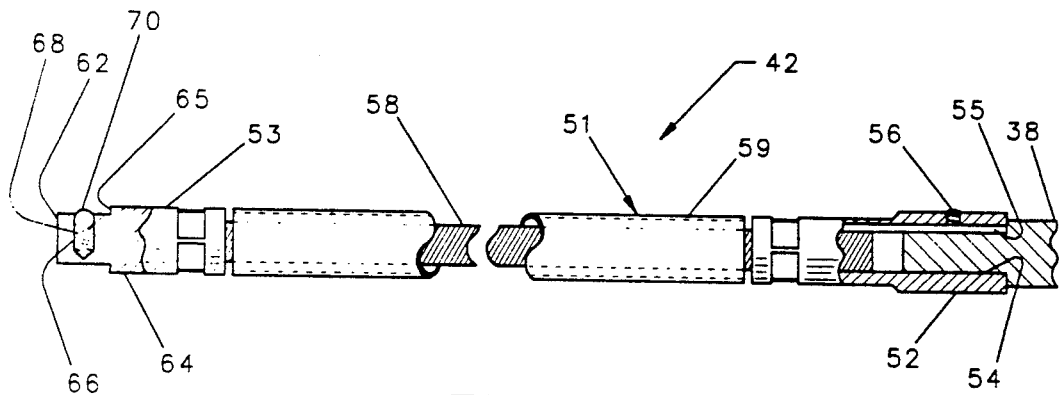
FIG. 4 is a front elevational detail view of the flexible drive member with portions thereof cut-away and shown in section.
Figure 5:
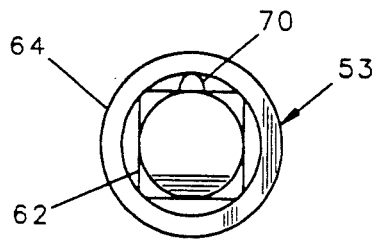
FIG. 5 is a left end view of the flexible drive member shown in FIG. 4.

Referring to FIGS. 4 and 5, an important feature of the present invention is a flexible drive member 42 having a flexible mid-section 51, and opposing end sections 52 and 53. The right end section 52 as shown in FIG. 4 is generally tubular in shape having an internal bore 54 and a keyway 55. The bore 54 is adapted to slidably fit over the distal end of the output shaft 38 which has a complementary key 57 as shown in FIG. 2 and can be locked in position on the shaft and key by lock screw 56. The mid-section 51 of the drive member 42 includes an internal wire coil 58 surrounded by a nylon sleeve 59 to provide flexibility and yet prevent an operator from suffering an injury as a result of the rotate of coil 58. It should be appreciated that the midsection 51 may be constructed of a flexible plastic or may use any other material known to have flexibility and the capacity to of convey rotational power. With the coil 58 of the preferred embodiment, one end of the coil 58 extends into the bore 54 in the first end member 52 and is retained therein by any suitable means known in the art, such as welding. The opposing end of the coil 58 extends into a blind bore, not shown, within the first end member 53 and is similarly retained therein. The first end member 53 has at its distal end 62 a polygon cross-section, such as a square, as best shown in FIG. 5. Adjacent the polygon shaped distal end 62, the first end member 53 has an enlarged section 64 creating a shoulder 65. A transverse blind bore 66 extends into one of the faces of the polygon distal end 62 into which is inserted a spring 68 and thereafter a hardened metal ball 70. The ball 70 is retained within the bore 66 by staking the outer edges thereof. The spring 68 is adapted to urge the metal ball 70 such that a portion thereof extends beyond the plane of the outer surface of the polygon shaped distal end 62.

Figure 9:
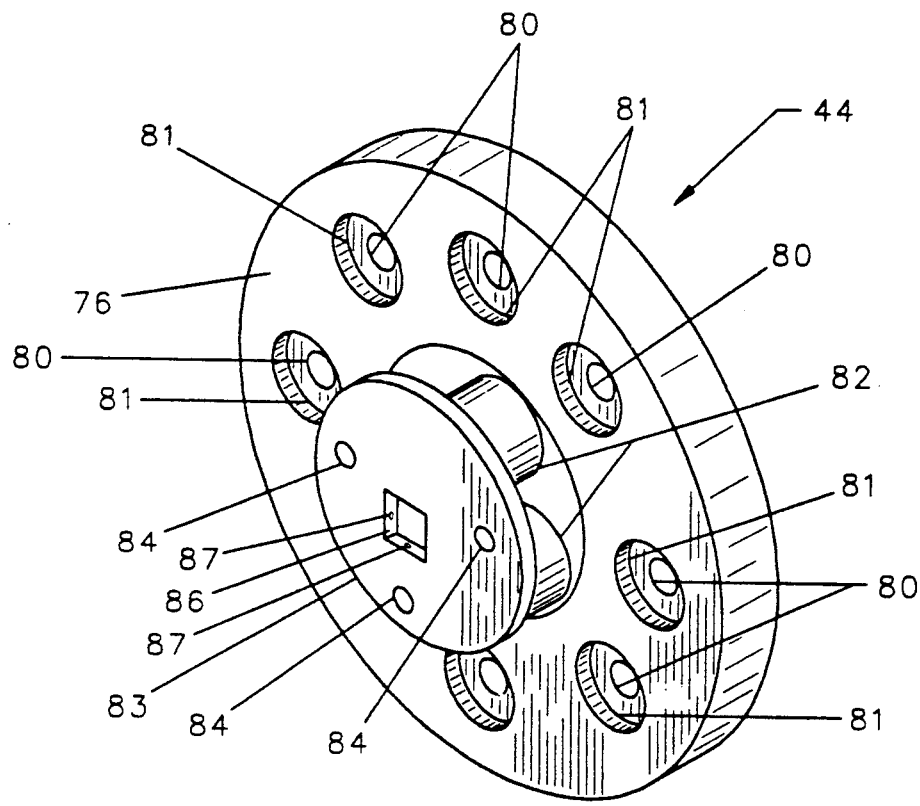
FIG. 9 is a perspective view of an adapter hub showing one face thereof.
Figure 10:
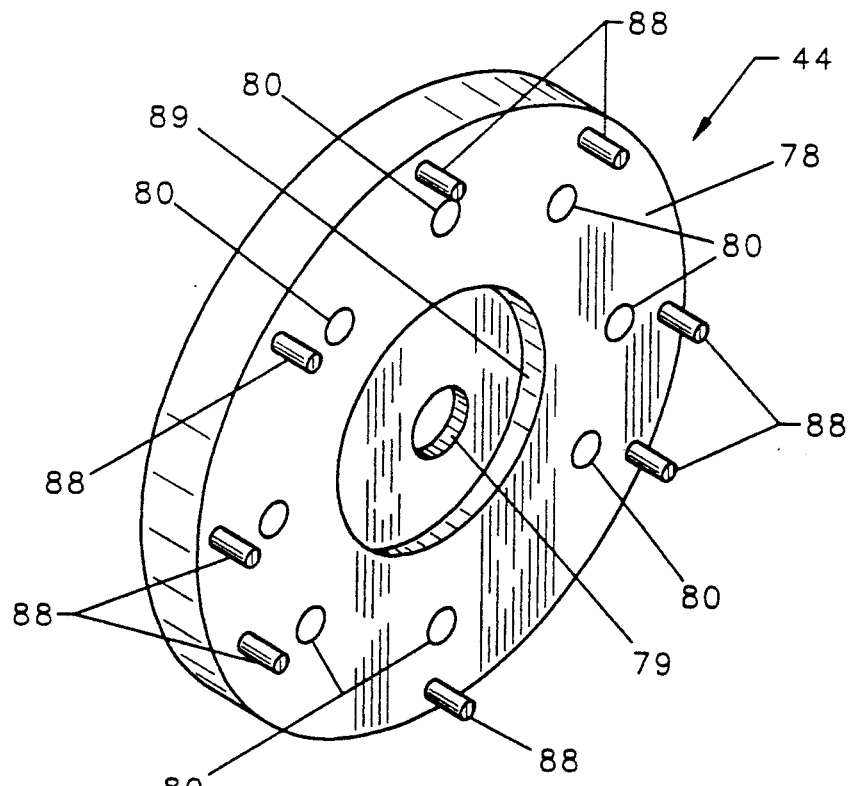
FIG. 10 is a perspective view of the adapter hub shown in FIG. 9 showing the opposing face thereof.

Referring to FIGS. 9 and 10, the lug adapter hub 44 is generally disc shaped having a first face 76, best shown in FIG. 9, and a second face 78, best shown in FIG. 10, and centrally located within the disc is a transverse bore 79. Surrounding the outer perimeter of the adapter hub 44 is a plurality of spaced transverse holes 80—80. The number of holes 80—80 and the spacing of the holes 80—80 about the perimeter of the adapter hub 44 is determined so as to provide an adequate number of anchoring locations, for example, 4, 5 or 6 equally spaced locations, for adapter legs as hereinafter described to drivingly anchor to and convey rotational driving motion to the rotor hub 49.

Referring to FIG. 9, the transverse holes 80—80 are each provided with counterbores 81—81 on the first face 76, and radially inwardly from the transverse holes 80—80 are a plurality of cylindrically shaped bosses 82—82, respectively, the upper surfaces of which are co-planar to each other and parallel to the plane of the first face 76. Centrally positioned over the bosses 82—82 is a circular drive flange 83 which is attached thereto by any suitable means such as a plurality of screws 84—84 passing through holes (not shown) into complementary threaded holes (not shown) in the bosses 82. Centrally located in the drive flange 83 is a polygon shaped transverse hole 86 sized and shaped so as to slidably receive the polygon shape of the distal end 62 of the drive member 42. Indentations 87—87 are provided in all four of the faces of the polygon shaped hole 86, and the indentations are sized and positioned such that when the polygon shaped distal end 62 of the drive member 42 is inserted into the polygon shaped hole 86, the indentation 87—87 will receive the protruding portion of the ball 70. When the distal end 62 is inserted inside the polygon hole 86 until the shoulder 65 contacts the outer surface of the drive flange 83, the ball 70 will extend into one of the indentations 87 and retain the distal end 62 of the drive member 42 therein.

Referring to FIG. 10, the second face 78 of the adapter hub 44 is provided with a plurality of pins 88—88, one pin being located axially outwardly of each of the transverse holes 80—80. Furthermore, a counterbore 89 is provided axially inwardly of each transverse hole 80. The adapter hub 44 is attached to the threaded studs 48 of a wheel hub 49 by a plurality of adapter legs 46—46.

Figure 6:
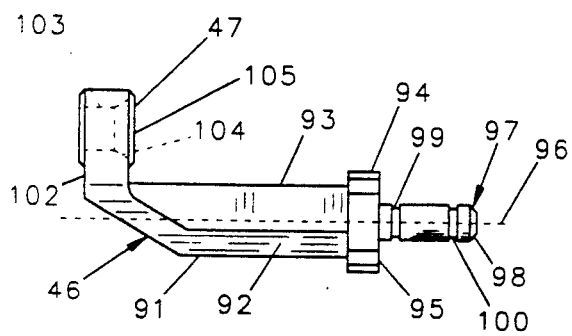
FIG. 6 is a front elevational view of a lug adapter leg.
Figure 7:
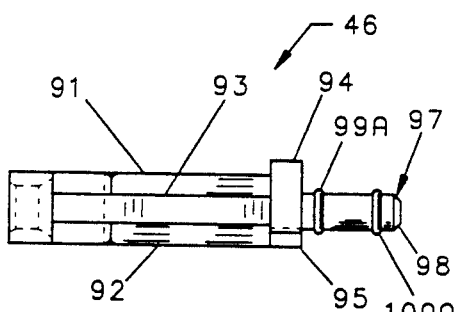
FIG. 7 is a top view of the lug adapter leg shown in FIG. 6.
Figure 8:
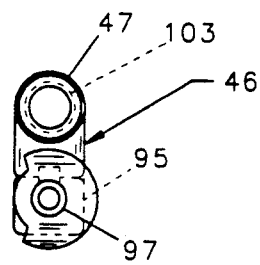
FIG. 8 is a right end elevational view of the lug adapter leg shown in FIG. 6.

Referring to FIGS. 6, 7 and 8, each adapter leg 46 has a longitudinally extending central section 91 which can have any appropriate cross-sectional shape. In the preferred embodiment, the central section 91 has a T-shaped cross section including a base portion 92 and central rib portion 93. At one end of the central section 91 is a transverse cam 94, the outer surface 95 of which is perpendicular to the longitudinal axis 96 of the adapter leg 46. A cylindrical pin end 97 extends perpendicularly from the outer surface 95 of the cam 94 and has a champhered distal end 98. The pin 97 has first and second annular grooves 99, 100 one of which, 99, is located near the outer surface 95 of the cam 94 and the second of which 100 is positioned adjacent the distal end of the pin 97. The grooves 99, 100 are adapted to receive O-rings 99A, 100A. The diameter of pin 97 is smaller than the diameter of each hole 80, but the outer diameter of each of the O-rings 97A, 100A is larger than the diameter of each hole 80, so that when the pin 97 is inserted into a transverse hole 80 with a twisting motion the O-rings 99A, 100A are press fit into the hole. Once the combination pin 97 and O-rings 99A, 100A are inserted into a hole 80, it will be retained within the transverse hole 80. While the press fit will retain each leg 46 in mounted position on hub 44, the legs may be twisted in their mounting, and may be removed from the hub manually by applying force in an outward axial direction.

The foot 47 of each of the adapter legs 46 has an end surface 102 perpendicular to he longitudinal axis 96 thereof. The foot 47 further has a transverse hole 103 having a flair 104 adjacent its inner surface 105. The transverse hole 103 has a diameter sufficiently large to slidably accept one of the threaded studs 48 extending from the wheel hub (not shown). Also the foot 47 is offset from the axis 96 of the adapter leg 46 sufficiently far to permit a threaded stud 48 to be inserted through the transverse hole 103 and be held in place by a lug nut (not shown) without the lug nut interfering with any portion of the central section 91 of the adapter leg 46.

The cam 94 is sized and shaped such that when the pin 97 of an adapter leg 46 is inserted into one of the transverse holes 80 in the adapter hub 44, the cam 94 will engage the associated pin 88 to permit the adapter leg 46 to be only partially rotated about its longitudinal axis 96 and provide only so much rotational movement as is needed to adjust the positioning of the feet 47 to accommodate the various configurations of threaded studs 48—48 (4, 5, 6 bolt, etc.) which may be provided on a standard wheel hub.

OPERATION

To operate the external drive assembly 10 in accordance with the present invention, an automobile 50 or other vehicle is hoisted, such that the tire thereof is lifted from the ground and the wheel removed from the threaded studs 48—48.

A plurality of adapter legs 46 are attached to the adapter hub 44 by inserting the pin 97 of each adapter leg 46 into one of the transverse holes 80—80 and the adapter hub 46. It is not necessary that one adapter leg 46 be provided over each of the threaded studs 48, but that there be a sufficient number of adapter legs be provided such that rotational motion from the adapter hub 44 can be conveyed through the adapter legs 46 to the rotor hub 49. After the adapter legs 46 are press fit onto the adapter hub 44, the feet 47 are rotated and positioned such that each of the feet 47 will slide over one of the threaded studs 48, and be retained thereon by a lug nut (not shown).

An external drive unit 10 can then be positioned adjacent the rotor hub 49 as shown in FIG. 3. Thereafter, the motor 27, shaft housing 32 and gear box 35 assembly can be pivoted such that the gear box 35 is at substantially the same elevation as the rotor hub 49. The gear box 35 can be adjusted axially about the motor shaft (not shown) in the housing 32 and locked into the desired position by the set screw 37. Thereafter, the drive member 42 can be fitted over the output shaft 38 of the gear box 35 and secured thereon by the lock screw 56. The first end 53, of the drive member 42 having the polygon shaped distal end 62 can be inserted into the polygon shaped hole 86 in the drive flange 83 and retained therein when the metal ball 70 extends into the indentation 87 in one of the faces of the polygon hole 86.

If the drive unit 10 is to be used to rotate a wheel such that a disc brake behind the wheel hub 49 can be machined, the brake lathe may then be attached to the automobile and the motor turned on. The motor will rotate the shaft (not shown) within the housing 32, drive through the gear box 35 and the output shaft 38 to the drive member 42. The flexible drive member 42 will permit rotational movement from the gear box 35 to be conveyed to the drive flange 83. In the event the output shaft 38 is not in direct alignment with the axis of the wheel hub 49, the flexible drive member 42 will adjust to the misalignment and permit rotational movement to be conveyed from the drive shaft 38 to the wheel hub 49 without causing the system to disassemble or damage the wheel hub 49. Flexibility is further provided between the adapter legs 46 and the adapter hub 44. The adapter legs 46 can be manually press fit into the chosen transverse hole 80 in the adapter hub 44, and manually selectably removed therefrom by twisting with an axially outward force. Once inserted, the leg 46 will be retained on hub 44 during compressive or rotational force operations. It will be understood that the legs are not adapted for providing tensile strength between a rotor hub 49 and an adapter hub 44.

As a result of the foregoing, there is disclosed a drive assembly 10 for providing rotational movement to the rotor hub 49 of an automobile 50 which will operate safely and effectively even though the drive assembly, and output shaft 38 thereof are not in direct alignment with the axis of the rotor hub 49.

While the present invention has been described in connection with one embodiment thereof, those skilled in the art will appreciate that modifications and variations can be made without departing from the true spirit and scope of the present invention. Therefore, it is intended by the appended claims to cover all such changes and modifications which are within the true spirit and scope of the present invention.

What is claimed:

1. In a portable drive assembly for providing external rotational power to a wheel hub of an automobile having a plurality of spaced threaded studs extending therefrom, said drive assembly including a portable base having means on the bottom thereof to reduce resistance to movement along a floor, a motor mounted on said base, an output shaft extending from said motor, the improvement comprising:
    a plurality of lug adapter legs, each of said legs having two ends, one of said ends being adapted to attach to one of said threaded studs on said wheel hub,
    an adapter hub having a plurality of apertures therein,
    connecting means for connecting said shaft to said adapter hub and conveying rotational movement from said shaft to said adapter hub,
    a plurality of cylindrical pins, one of said pins on each of said adapter legs, each of said cylindrical pin having a length and size to slidably fit within said apertures in said adapter hub,
    one of said pins and said adapter hub apertures having a groove around the circumference thereof, and
    an O-ring fitted on said groove for releasably attaching said other of said ends of said adapter leg in said apertures in said adapter hub.

2. The improvement in a drive assembly in accordance with claim 1 further comprising:
    a second pin on one of said adapter hub and said adapter leg, and
    a cam on the other of said adapter hub and said adapter leg for engaging said second pin and limiting rotational movement of said adapter leg about said cylindrical pin.

3. A portable drive assembly for providing external rotational power to the wheel hub of an automobile, said portable drive assembly comprising in combination:
    a portable base having means below said base for reducing resistance to movement of said base along a floor,
    a motor mounted on said base,
    said motor having output shaft means extending therefrom, a flexible drive member having two ends with a resilient yieldable shaft portion extending therebetween, one of said ends being adapted to attach to said output shaft means, an adapter hub, attachment means for attaching the other of said ends of said flexible driving member to said adapter hub, and a plurality of adapter legs, each of said adapter legs having two ends, one of said ends removably attachable to said threaded studs projecting from said wheel hub and the other of said ends removably attachable to said adapter hub.

4. A portable drive assembly in accordance with claim 3 wherein each of said adapter legs has a pin on one of said ends, and an O-ring on said pin and said end having said pin and said O-ring are removably retained in a transverse hole in said adapter hub.

5. A portable drive assembly in accordance with claim 4 wherein said flexible drive member is a coil spring.

6. The drive assembly as set forth in claim 5 wherein said flexible drive member includes a sleeve having a keyway therein adjacent one of said ends for receiving a distal end of said drive shaft.

7. The drive shaft assembly as set forth in claim 5 wherein one of said ends of said flexible drive member defines a polygon cross sectional shape adapted to matingly engage a complimentary polygon cross-sectional shaped hole in said adapter hub.

8. The improvement in a drive assembly in accordance with claim 4 further comprising:

a second pin on one of said adapter hub and said adapter leg, and a cam on the other of said adapter hub and said adapter leg for engaging said second pin and limiting rotational movement of said adapter leg about said cylindrical pin.

* * * * *